T. MAJOR.
ROAD-SCRAPER.
No. 175,125. Patented March 21, 1876.
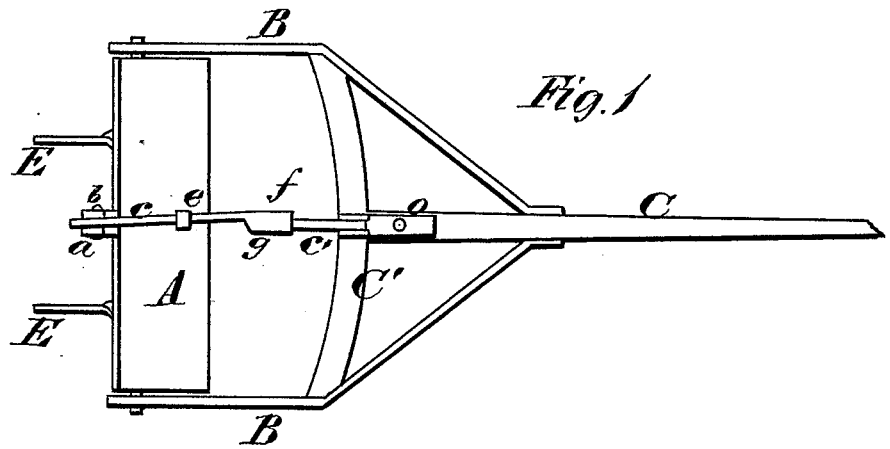
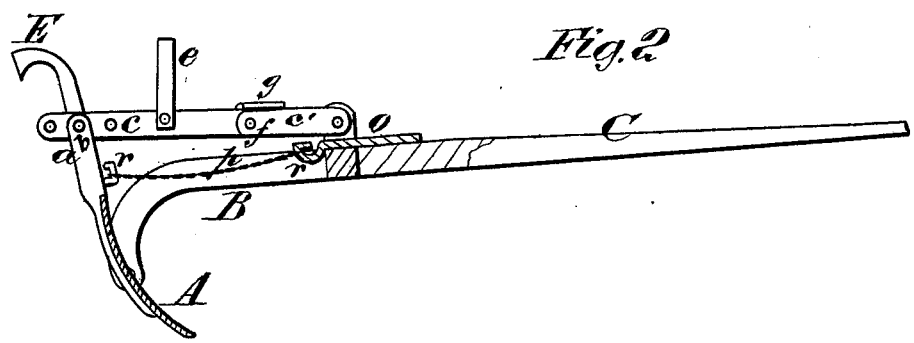
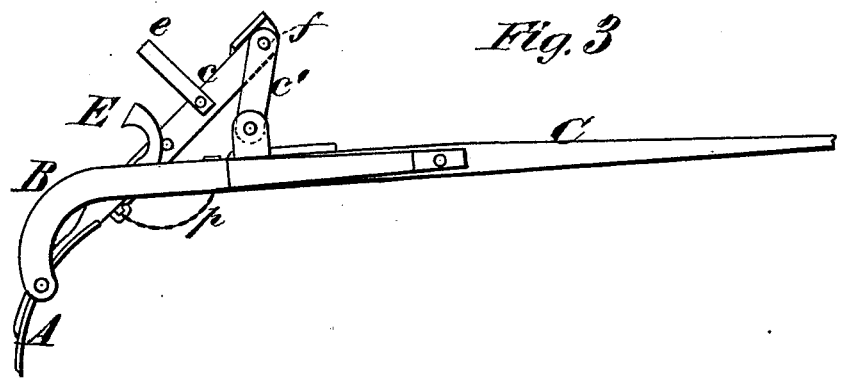

UNITED STATES PATENT OFFICE.

THOMAS MAJOR, OF FRANKFORT, INDIANA.

IMPROVEMENT IN ROAD-SCRAPERS.

Specification forming part of Letters Patent No. 175,125, dated March 21, 1876; application filed February 5, 1876.

*To all whom it may concern:*

Be it known that I, THOMAS MAJOR, of Frankfort, in the county of Clinton and State of Indiana, have invented a new and valuable improvement in Road-Scrapers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my road-scraper, and Fig. 2 is a longitudinal vertical sectional view of the same. Fig. 3 is a side elevation thereof.

This invention has relation to implements for grading and scraping roads and for making ditches; and the nature of my invention consists in a concave shovel or scraping blade, which is pivoted to the rear ends of two draft-irons, to which a tongue is rigidly secured, in combination with locking-joints, which are adjustable and also removable, as will be hereinafter explained.

In the annexed drawings, A designates the scraping blade, which is concave on that side presented to the earth, and which is connected to the rear downwardly-curved portions of draft-irons B B. The blade A is thus allowed to assume the two positions shown in Figs. 2 and 3, the one for scraping and the other for dumping the gathered load.

The draft-irons are rigidly secured to a tongue, C, and to the ends of a cross-piece, C′, on the rear end of this tongue, as shown in Fig. 1. The scraper-blade A is thus allowed to be oscillated freely when it is not held by a locking device, which I am about to describe.

E E are two handles secured to the blade A, on each side of a vertically slotted arm, $a$, which latter is rigidly secured to the blade at the middle of its length, and has pivoted to it by a removable pin, $b$, the rear link $c$ of the rocking device. Several holes are made through the link $c$ for receiving pin $b$, and allowing the blade to be adjusted to run at any desired angle. A handle, $e$, is fixed to the link $c$, which the driver grasps when he desires to break the joint $f$. The link $c'$ is pivoted to the link $c$ just beneath a stop-lip, $g$, formed on the latter, and intended to prevent the joint at $f$ flexing below the point shown in Fig. 2. The front end of the link $c'$ is pivoted between ears formed on a plate, $o$, which is secured to the draft-tongue. When the joint $f$ is depressed as shown in Fig. 1, the shovel A will be locked in scraping position, and the several pivotal connections of the locking device will be sustained from undue strain by means of a stay-chain, $p$, attached to hooks $r$ $r$. When a load has been gathered the attendant dumps it by breaking the joint $f$.

If desired, thills for a single horse may be substituted for the single draft-tongue shown.

What I claim as new, and desire to secure by Letters Patent, is—

The concave scraper A, pivoted to the draft-irons B, and also to the link $c$, by the removable pin $b$, in combination with the link $c$, having perforations for adjustment at its outer end, and provided with the handle $e$ and stop-lip $g$ and the pivoted link $c'$, substantially as described, and for the purpose set forth.

In testimony that I claim the above I have hereunto subscribed my name in the presence of two witnesses.

THOMAS MAJOR.

Witnesses:
 PERRY W. GARD,
 WILLIAM R. MOORE.